United States Patent
Nerreter et al.

(10) Patent No.: US 6,589,431 B2
(45) Date of Patent: Jul. 8, 2003

(54) METHOD FOR GIVING A FLUID COOLANT A BIOCIDAL PROPERTY

(75) Inventors: Ulrich Nerreter, Nuremberg (DE); Meike Pielach, Erlangen (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 09/849,976

(22) Filed: May 7, 2001

(65) Prior Publication Data

US 2002/0001627 A1 Jan. 3, 2002

(30) Foreign Application Priority Data

May 5, 2000 (DE) .......................... 100 21 941
Mar. 30, 2001 (DE) .......................... 101 15 900

(51) Int. Cl.[7] .................................. C02F 1/50
(52) U.S. Cl. .................. 210/759; 210/764; 210/765; 422/28; 424/618; 424/635; 424/641
(58) Field of Search .............. 210/696, 698, 210/764, 759, 765; 422/28; 424/635, 641, 618

(56) References Cited

U.S. PATENT DOCUMENTS

| | | | |
|---|---|---|---|
| 2,521,713 A | * | 9/1950 | Goetz ................. 106/18.36 |
| 3,805,880 A | * | 4/1974 | Lawlar ................ 165/104.19 |
| 4,492,618 A | | 1/1985 | Eder ..................... 204/152 |
| 4,749,537 A | | 6/1988 | Gautschi et al. ......... 264/232 |
| 5,098,582 A | | 3/1992 | Antelman ............... 210/759 |
| 5,198,118 A | * | 3/1993 | Heskett ................. 210/638 |
| 5,342,528 A | | 8/1994 | Adachi et al. .......... 210/688 |
| 5,570,021 A | | 10/1996 | Dachniwskyj et al. ..... 324/318 |
| 6,093,422 A | | 7/2000 | Denkewicz, Jr. et al. .. 424/618 |
| 6,236,207 B1 | | 5/2001 | Arz et al. ............. 324/318 |

FOREIGN PATENT DOCUMENTS

| | | |
|---|---|---|
| DE | 198 39 987 | 3/2000 |
| DE | 198 42 868 | 3/2000 |
| EP | 0 390 353 | 3/1990 |
| WO | WO 97/20461 | 6/1997 |

OTHER PUBLICATIONS

Abstract for Japanese Application 11042484.
"Kühlwasser," Held, Second Edition (1977) p. 320.
"Kühlwasser," Held, Fifth Edition (200) pp. 248–250.

* cited by examiner

Primary Examiner—Peter A. Hruskoci
(74) Attorney, Agent, or Firm—Schiff Hardin & Waite

(57) ABSTRACT

In a method for giving a biocidal property to a coolant in a fluid cooling circulation, the fluid cooling circulation has at least one device that exhibits at least one metal oxide that is in contact with the coolant, the coolant has a substance added to it that causes an acidic pH value of the coolant, at least for a time, and as a result of the acidic pH value of the coolant, metal ions are released from the metal oxide, these metal ions giving the coolant the biocidal property.

14 Claims, 1 Drawing Sheet

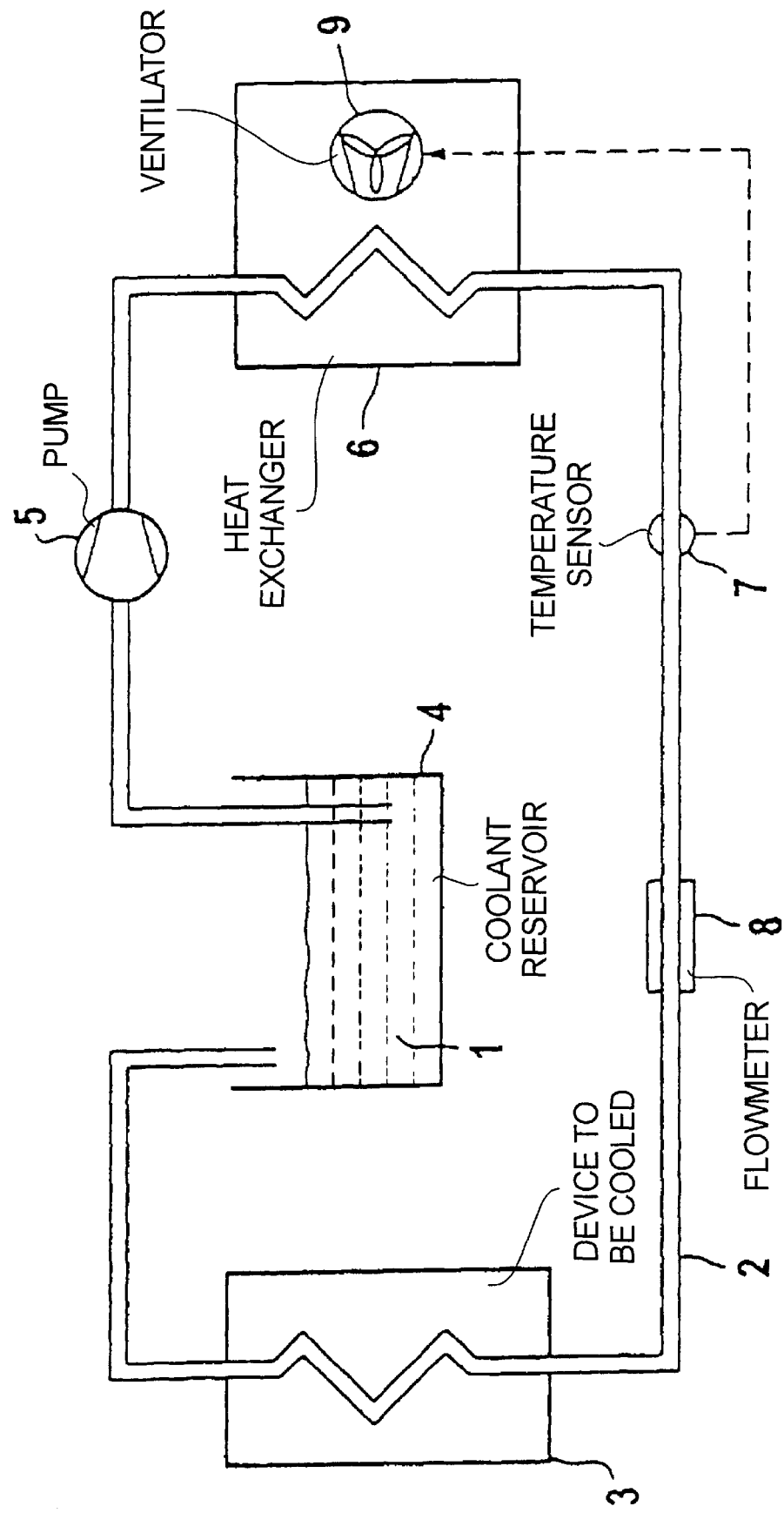

METHOD FOR GIVING A FLUID COOLANT A BIOCIDAL PROPERTY

BACKGROUND OF THE INVENTION

1. Field of the Invention

The invention is directed to a method for producing a biocidal property of a coolant in a fluid cooling circulation.

2. Description of the Prior Art

Fluid cooling circulations are utilized in many fields of technology for, among other things, enhancing the performance in systems that generate waste heat. For example, a magnetic resonance apparatus often has at least one fluid cooling circulation. In a magnetic resonance apparatus, rapidly switched gradient fields that are generated by a gradient system containing gradient coils and gradient amplifiers are superimposed on a static basic magnetic field that is generated by a basic field magnet system. Further, the magnetic resonance apparatus has a radio-frequency system containing radio-frequency antennas that emit radio-frequency signals into an examination subject for triggering magnetic resonance signals and that pick up the generated magnetic resonance signals from which image datasets are produced.

During operation, a pulsed current flows through a gradient coil. The currents thereby achieve amplitude values of up to several 50 A and are subject to frequent and rapid changes in the direction of the current with rise and decay rates of several 50 kA/s. Due to the ohmic impedance of the gradient coil, these currents convert a substantial amount of energy into heat. For maintaining a high performance capability of the gradient coil, it is often cooled with a fluid cooling circulation for eliminating the heat. For example, U.S. Pat. No. 5,570,021, German PS 198 35 414 and German OS 198 39 987 disclose fluid cooling circulations for cooling gradient coils.

If the basic field magnet is implanted as a permanent magnet, the permanent magnet is kept at a constant operating temperature with a fluid cooling circulation in order to avoid fluctuations in the basic magnetic field due to temperature fluctuations of the permanent magnet. Further, power semiconductor components of the gradient amplifiers, radio-frequency antennas and power pack components in the magnetic resonance apparatus are often cooled with a fluid cooling circulation in order to achieve a high performance capability.

Such a fluid cooling circulation is often operated as an open circulation, i.e. the coolant, particularly water, is at atmospheric pressure and/or the coolant circulation has a coolant compensation device. In particular, such a cooling circulation is susceptible to bacterial contamination. In addition to bacterial contamination itself, coatings and deposits arise within the fluid cooling circulation due to the bacterial contamination, resulting in a diminution of the flow cross-section. Further, the frictional drag increases. The coatings and deposits have a disruptive effect on optical glasses of the fluid cooling circulation. Moreover, plasticizers are sometimes used in the fluid cooling circulations, and the resulting plastic becomes more brittle as a result of the bacterial contamination. The coatings and deposits ultimately lead to a blockage of filters and sieves and cause an increase of heat transmission coefficients in heat exchangers and cooling elements. Among other things, the bacterial contamination also leads to a microbially induced corrosion.

Bacterial contamination and the consequences thereof conventionally have been counteracted by adding partly toxic biocides or poisons, for example based on bromides and/or chlorides. Particularly in a clinical environment wherein a majority of magnetic resonance apparatuses are operated, such a use of toxic biocides and/or poisons is dangerous due to their proximity to patients and is highly undesirable. Further, complicated hazardous material transport rules as well as national import and export regulations must be adhered to when shipping such biocides or poisons. The two latter factors are particularly aggravated if the biocides or poisons exhibit a fluid aggregate state at room temperature.

German OS 29 11 288 discloses a method for disinfecting water, particularly in swimming pools. Electrodes of a copper-silver alloy immersed into the water are thereby connected to a d.c. source for generating copper and silver ions, and sodium persulfate is added to the water for the oxidation of organic substances. It is known that an semi-dynamic sterilization of water can be achieved with copper and silver ions. The sterilization with copper and silver ions is promoted by employing sodium persulfate that, under the influence of copper and silver ions, leads to the release of oxygen with which organic substances are oxidized.

The book by H. -D. Held, "KUhlwasser", $5^{th}$ Edition, Vulkan-Verlag, Essen, 2000, pages 248–250, describes an action of copper sulfate as an algicide and algae stabilizer by the addition of copper sulfate to cooling water. This text It is also describes that the microcidal effect of the copper sulfate given higher pH values can be counteracted by the formation of precipitates, for example precipitates that contain copper carbonate in a cooling water that contains carbonate hardness. The formation of precipitates is prevented by adding surfactants. For example, additives of citric acid are used.

German OS 198 42 868 discloses a method and filters for water purification in swimming pools and laundry systems. A filter having a multi-layer structure composed of filter devices and a copper packing is utilized in a skimmer system, the copper packing being composed of copper wool, copper wire fabric of copper sieves. When methods and filters are utilized in algae-contaminated systems, it is advantageous that the algae be very rapidly eliminated with a one-time dose of copper sulfate. A renewed growth of algae is prevented independently of pH value by the introduction of copper ions into the circulation system from the copper packing. The installation of a copper packing is suitable for combating algae in industrial water circulations, but is not suitable in other systems, for example cooling circulations.

SUMMARY OF THE INVENTION

An object of the present invention is to provide an improved method for giving a biocidal property to a coolant in a fluid cooling circulation.

This object is inventively achieved in a method wherein the fluid cooling circulation has at least one device that exhibits at least one metal oxide that is in contact with the coolant, a substance is added to the coolant that produces an acidic pH value of the coolant, at least for a time, and as a result of the acidic pH value of the coolant, metal ions are released from the metal oxide, the metal ions giving the coolant the biocidal property.

Since at least one device of the fluid cooling circulation that, for example, is composed of a metal and has a metal oxide layer that is in contact with the coolant is already inherently present in most fluid cooling circulations, the employment of additional, specific electrodes or substances that release metal ions is not needed. As a result of the acidic pH value of the coolant, the metal ions are released in an adequate concentration as a result of an etching of the metal oxide. In order to prevent a decomposition harmful to the fluid cooling circulation, the pH value should not be selected too low, for example at approximately five. Further, the decomposition is also prevented because the pH value of the coolant returns to about the neutral pH value after a time duration of, for example, a few days. This is not harmful to the biocidal property of the coolant since sufficient metal ions have been dissolved before then. The bacterial contamination is inhibited as a result of a bactericidal effect of the metal ions, so that the use of toxic biocides or poisons can be foregone.

Further, the formation of the biocidal property in a fluid cooling circulation already filled with the coolant can be achieved by adding the pH-altering substance. Since a substance can be employed that exhibits a solid aggregate state at room temperature and/or that is neither a hazardous substance nor a hazardous material in and of itself, complicated measures in conjunction with regulations for hazardous substances or hazardous materials and/or national import and export rules can be avoided. Further, employment of the pH-altering substance is comparatively unproblematical in the clinical field compared to toxic biocides and/or poisons.

In an embodiment, the metal oxide is copper oxide, zinc oxide and/or silver oxide. Ions of the metals have an especially high bactericidal effect.

DESCRIPTION OF THE DRAWINGS

The single FIGURE is a schematic illustration of a fluid cooling circulation operating in accordance with the inventive method.

DESCRIPTION OF THE PREFERRED EMBODIMENTS

As an exemplary embodiment of the invention, the FIGURE shows a fluid cooling circulation with a coolant 1 whose main constituent is water. The fluid cooling circulation has a conduit system 2, a device 3 to be cooled, a coolant reservoir 4, a coolant pump 5, a heat exchanger 6, a temperature sensor 7 and a flow meter 8. The heat exchanger further has a ventilator 9 that is controlled by the temperature sensor 7 dependent on a temperature of the coolant 1. In another embodiment, the heat exchanger 6 is fashioned such that, instead of the ventilator 9 in the heat exchanger 6, elimination of heat ensues from the coolant 1 to another circulatory system The device 3 to be cooled is one or more of gradient coil, power components of a gradient amplifier, a radio-frequency antenna, of a radio-frequency amplifier and/or of power pack parts in a magnetic resonance apparatus. At least one of the aforementioned components of the fluid cooling circulation has a metallic component part of copper with a copper oxide layer that is in contact with the coolant 1.

The fluid cooling circulation is fashioned as an open cooling circulation. The coolant 1 in the coolant reservoir 4 is in contact with air, so that an undesired bacterial contamination of the fluid cooling circulation can arise due to the contact with air if no counter-measures are undertaken. The undesired effects of bacterial contamination have already been presented.

In order to dependably prevent bacterial contamination, a substance that effects a slightly acidic pH value of the coolant 1 is added to the coolant 1 after the fluid cooling circulation has already been filled with the coolant 1. At room temperature, the substance has a solid aggregate state and is neither a hazardous substance nor a hazardous material in and of itself, so that the substance can be comparatively simply and reliably transported, even across international boundaries.

The slightly acidic coolant 1 causes an etching of the copper oxide layer, so that copper ions are released into the coolant 1 and reliably prevent a bacterial contamination due to their bactericidal action. A quantity of the substance is thereby selected such that the coolant 1 is acidic enough to etch the copper oxide layer but is not so acidic that the coolant 1 damages the fluid cooling circulation due to a decomposition of components thereof. Suitable pH-altering substances are light organic acids, citric acid, acetic acid and/or hydrogen peroxide (the latter if the coolant is inherently too strongly acidic).

The above discussion applies to components that contain metals other than copper, for example zinc or silver. Zinc and silver ions have a bactericidal effect comparable to that of copper ions.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for giving a biocidal property to a fluid coolant in a cooling circulation, comprising the steps of:
   circulating a fluid coolant in a fluid coolant circulation of a magnetic resonance system;
   adding a pH-altering substance to said coolant to at least temporarily give said fluid coolant an acidic pH value; and
   conducting said fluid coolant in said circulation through at least one device having a metal oxide in contact with said fluid coolant so that, due to said acidic pH value of said fluid coolant, metal ions are released from said metal oxide to give said fluid coolant a biocidal property.

2. A method as claimed in claim 1 comprising selecting said metal oxide from the group consisting of copper oxide, zinc oxide and silver oxide.

3. A method as claimed in claim 1 comprising adding said pH-altering substance to said fluid coolant to give said fluid coolant a pH value of approximately 5.

4. A method as claimed in claim 1 comprising circulating water in said fluid coolant circulation as said fluid coolant.

5. A method as claimed in claim 1 comprising selecting said pH altering substance from the group consisting of citric acid, acetic acid and hydrogen peroxide.

6. A method as claimed in claim 1 comprising circulating said fluid coolant in an open fluid coolant circulation.

7. A method as claimed in claim 1 wherein the step of conducting said fluid coolant in said circulation through at least one device comprises conducting said fluid coolant through a power component of said magnetic resonance apparatus.

8. A method as claimed in claim 1 comprising employing, as said pH-altering substance, an organic acid which at least temporarily gives said fluid coolant a pH value of approximately five.

9. A method for giving a biocidal property to a fluid coolant in a cooling circulation, comprising the steps of:

circulating a fluid coolant in a fluid circulation of a magnetic resonance system with a portion of said fluid coolant circulation proceeding through a device to be cooled containing a metal oxide and directly exposing said metal oxide to said portion of said fluid coolant circulation;

adding a pH-altering substance to said fluid coolant to at least temporarily give said fluid coolant and acidic pH value; and in said portion of said fluid coolant circulation proceeding through said device to be cooled, allowing said fluid coolant to contact said metal oxide so that, due to said acidic pH value of said fluid coolant, metal ions are released from said metal oxide to give said fluid coolant a biocidal property.

10. A method as claimed in claim 9 comprising selecting said metal oxide from the group consisting of copper oxide, zinc oxide and silver oxide.

11. A method as claimed in claim 9 comprising adding said pH-altering substance to said fluid coolant to give said fluid coolant a pH value of approximately 5.

12. A method as claimed in claim 9 comprising circulating water in said fluid coolant circulation as said fluid coolant.

13. A method as claimed in claim 9 comprising selecting said pH altering substance from the group consisting of citric acid, acetic acid and hydrogen peroxide.

14. A method as claimed in claim 9 comprising circulating said fluid coolant in an open fluid coolant circulation.

* * * * *